United States Patent [19]
Dunkley

[11] 3,781,938
[45] Jan. 1, 1974

[54] CAR WASH

[76] Inventor: Willis R. Dunkley, 2804 Pierce Ave., Ogden, Utah 84400

[22] Filed: Mar. 29, 1972

[21] Appl. No.: 239,237

[52] U.S. Cl. .............................. 15/21 E, 15/DIG. 2
[51] Int. Cl. ............................................. B60s 3/06
[58] Field of Search ...................... 15/DIG. 2, 21 D, 15/21 E, 53, 97

[56] References Cited
UNITED STATES PATENTS

| | | | |
|---|---|---|---|
| 3,208,088 | 9/1965 | Sulzberger et al. | 15/21 E |
| 3,641,606 | 2/1972 | Lee | 15/21 E |

FOREIGN PATENTS OR APPLICATIONS

| | | | |
|---|---|---|---|
| 873,953 | 6/1971 | Canada | 15/DIG. 2 |
| 1,440,955 | 4/1966 | France | 15/DIG. 2 |
| 1,803,749 | 2/1970 | Germany | 15/DIG. 2 |
| 1,076,135 | 7/1967 | Great Britain | 15/DIG. 2 |
| 1,198,415 | 7/1970 | Great Britain | 15/DIG. 2 |
| 459,782 | 9/1968 | Switzerland | 15/DIG. 2 |

Primary Examiner—Edward L. Roberts
Attorney—B. Deon Criddle

[57] ABSTRACT

A car wash wherein a vehicle is subjected to an arrangement of rotating brushes that efficiently scour the vehicle sides, ends and top while soap and water rinse sprays are being alternately directed thereover. The car wash incorporates a movable console arranged to travel about the vehicle on a track within which the vehicle is positioned. Maintained within the movable console are the support apparatus such as soap dispensing and water spray pumps, hydraulic and electrical motors, and associated lines and valves as well as timing mechanisms for controlling the operations within the car wash. Arms are pivotally connected to the sides of the movable console that mount upstanding rotatable brushes suitable for washing. The sides and ends are mounted on the free ends of the arms. Motors rotate the brushes and the brushes are resiliently maintained in contact with the vehicle as the movable console travels around the vehicle. The movable console operates the brushes to provide alternate pushing of one upstanding brush over crevices and bends in the vehicles contoured surfaces and a dragging of the other rotating brush over the surfaces. A cantilever arm is mounted to the top of the console and another motor driven rotating brush journaled thereby is arranged to wipe the top and hood and rear deck areas of the vehicle. Soap and water sprays and clear water rinse sprays are also dispensed onto the vehicles top and hood areas from a spray arrangement carried by the cantilever arm.

9 Claims, 6 Drawing Figures

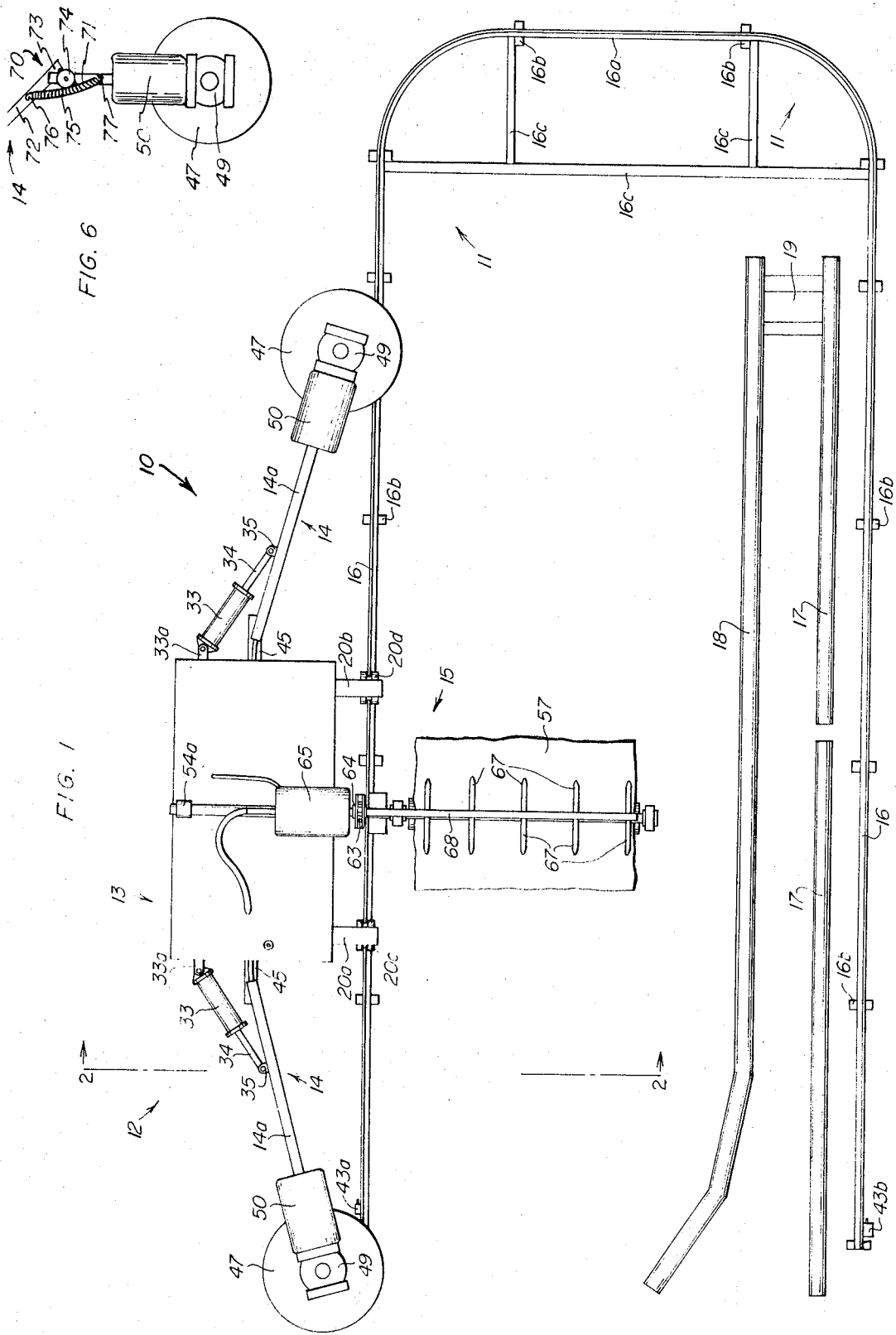

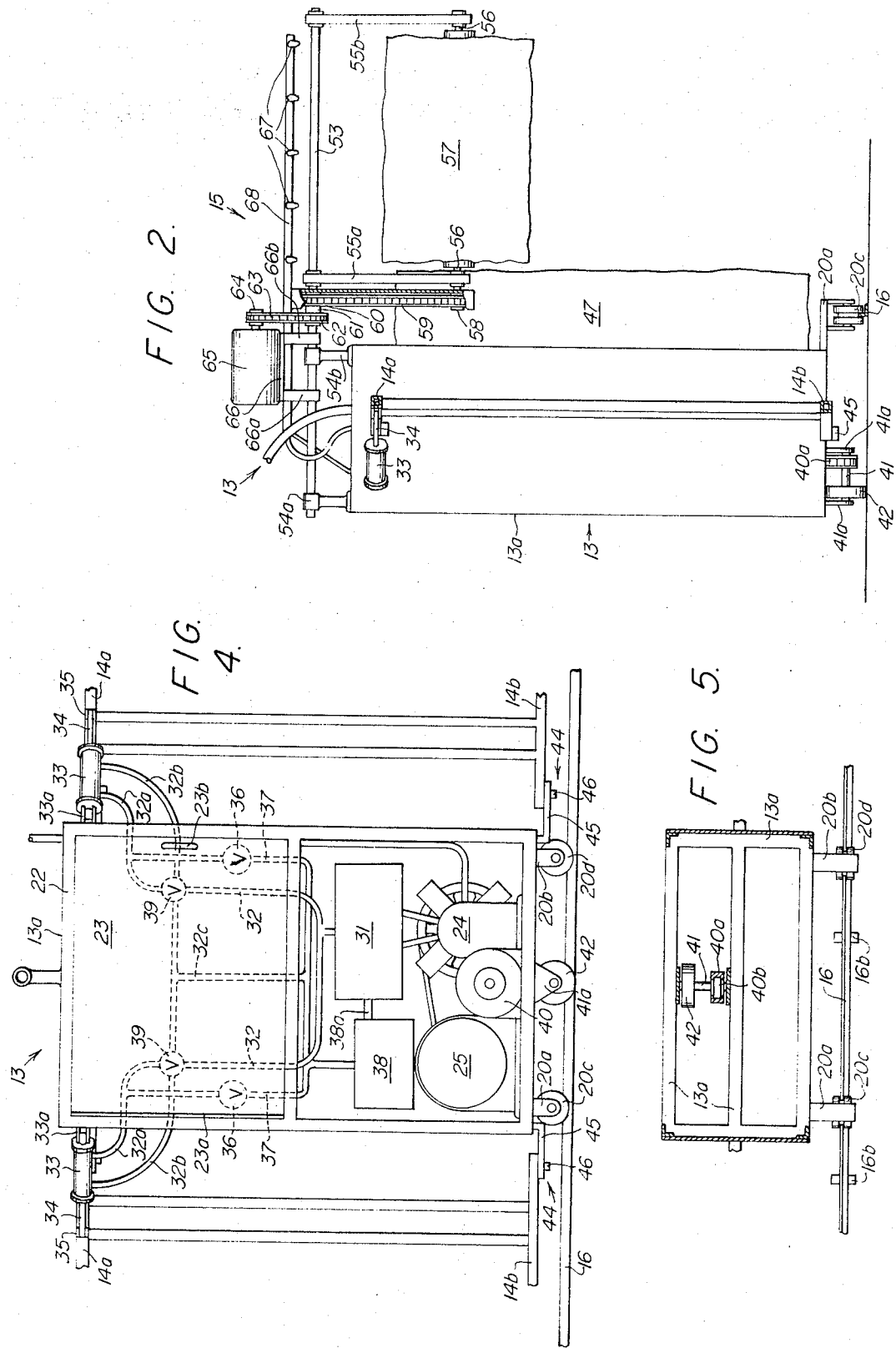

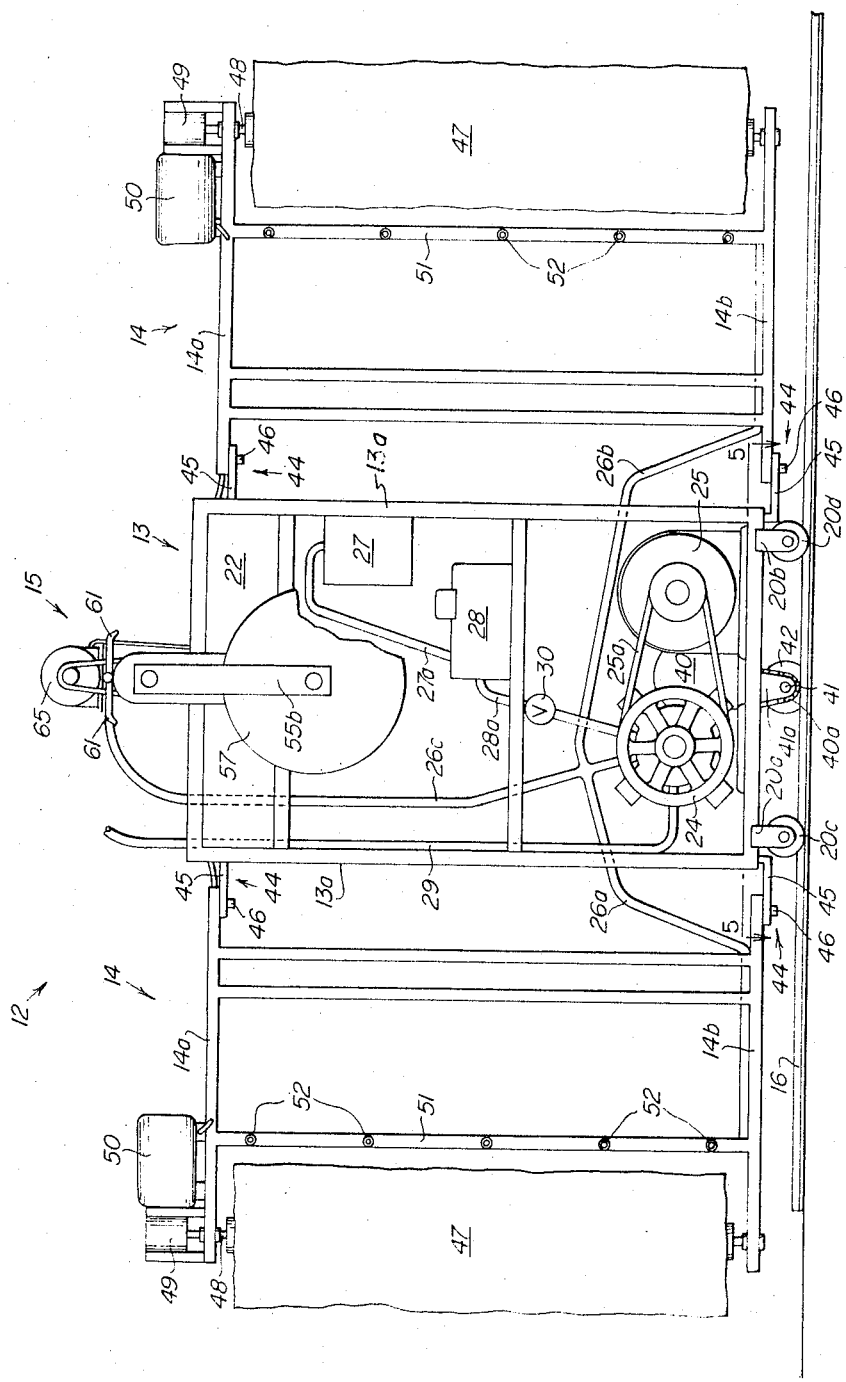

CAR WASH

BRIEF DESCRIPTION OF THE INVENTION

1. Field of the Invention

This invention related to automatic car wash apparatus.

2. Prior Art

In recent years many automated devices have been developed for washing vehicle exteriors. Some such devices include high pressure spray nozzles arranged to travel around a vehicle on a continuous track spraying with a high pressure spray of soap or water rinse solutions over the vehicles exterior. Car wash systems employing rotating brushes in conjunction with soap and water rinse sprays are also known and are in common use. Such rotating brush devices have generally involved fixed brush arrangements through which the vehicle is moved with brush travel limited to movements across the ends and top of the vehicle. Such spray arrangements, with or without rotating brushes associated therewith, have proven to be somewhat effective in cleaning most of a vehicles surfaces, but still fail to effectively remove dirt from corners and crevices therein.

To my knowledge, there has not heretofore been known a car wash system that employs an arrangement of rotating brushes mounted to a movable console that pushes a brush around a vehicle while holding the brush in intimate vehicle contact so that all portions of the vehicles' surface are effectively scrubbed, and that employs a trailing pulled brush to further clean vehicle surfaces.

SUMMARY OF THE INVENTION

The principal object of the present invention is to provide a car wash system that will automatically clean the exterior surfaces of a vehicle.

Another object is to provide a car wash system that incorporates a movable console with liquid spray arrangements and movable arms that have rotating brushes journaled to their ends such that travel of the movable console alongside a vehicle brings the rotating brushes into contact with all areas of the vehicle body which are simultaneously being sprayed with a soap or rinse water solution.

Still another object is to provide a compact movable console in which are contained or on which are mounted the soap and rinse water spray pumps, hydraulic and electrical motor arrangements, appropriate lines and valves, and electrical control circuitry means, whereby the movable console contains therein or mounts thereon all of the component apparatus of the car wash except the track.

Principal features of the present invention include a movable console arranged to travel on a track such that soap and water spray arrangements on the movable console and rotating upstanding brushes connected thereto by arms can operate against the entire surface of a vehicle positioned within the track of the car wash.

The arms are hydraulically controlled to swing the upstanding rotating brush thereon into contact with the vertical surfaces of the vehicle. Contact pressure between the rotating brushes and vehicle sides is closely controlled through the use of fluid by-pass arrangements so that the rotating brushes will efficiently wash the vehicle's surface but will not cause damage to the vehicle or accessories thereof.

A cantilever arm, mounted to the movable console, reaches over the top of the vehicle during washing operations. This overhead arm has a rotating brush and a spray arrangement thereon to act on the vehicle top, hood and rear deck areas as the movable console travels around the vehicle. The arm is freely swinging and wiping ends of the rotating brush carried by the arm engage the hood and top of a vehicle and the brush may rest lightly on the top of a vehicle being washed.

The movable console carries all of the component apparatus of the invention with electrical power and water supplied thereto through lines suspended from above the car wash. An electrical motor located within the movable console operates through a continuous chain to power a drive wheel which moves the body structure back and forth on its track.

Electrical motors mounted on the brush arms continuously rotate the brushes while the car wash is in operation.

Soap solution and water are sprayed onto the vehicle through nozzle arrangements mounted to each of the brush arms.

Additional objects and features of the invention will become apparent from the following detailed description and drawings, disclosing what is presently contemplated as being best modes of the invention.

THE DRAWINGS

FIG. 1 is a top plan view of the car wash system;

FIG. 2, an end elevation view showing an overhead cantilevered arm and attached rotating brush mounted to a movable console of the car wash;

FIG. 3, a front elevation view of the movable console, arms and brushes;

FIG. 4, a rear view of the movable console of the car wash of FIG. 3, with the brush arms shown fragmentarily; and FIG. 5, horizontal sectional view taken along line 5—5 of FIG. 3, showing the drive arrangement whereby the movable console is moved on its track.

FIG. 6, a fragmentary top plan view of an alternate arm construction.

DETAILED DESCRIPTION

Referring now to the drawings:

In the illustrated preferred embodiment, the car wash, shown generally at 10, includes a track 11 which serves as a guide for a wash assembly 12. The wash assembly 12 comprises movable console 13 with swinging arms 14 which are connected to opposite ends of the console. The arms 14 are of identical construction so components or structures hereafter described as being incorporated into one should be taken as included in the other. An overhead cantilever arm structure, shown generally at 15 is mounted to the top of the movable console 13.

The track 11 includes parallel, track sections 16, FIG. 2, joined at one set of adjacent ends by a curved section 16a. The parallel track sections and the web have upstanding rails that are maintained in an upright attitude by brackets 16b, which secure the track to a floor. Reinforcing cross members 16c, at the curved section further secure the track 11 to the floor. Guide rails 17 are provided along the track section 16 and serve as vehicle wheel guide means for positioning a vehicle within the car wash. Legs 20a and 20b extend from the base of the movable console 13 and carry guide wheels 20c and 20d that travel on track 11. As shown best in FIG. 1, another vehicle wheel guide rail 18 is provided within the track 11 to cooperate with guide rail 17 in guiding a vehicle wheel into contact with a pressure plate switch 19. Switch 19 is electrically connected to conventional electrical control circuitry, not shown, that is mounted in the movable console 13 and that controls operation of the vehicle wash cycle, as will be hereinafter explained.

Console 13 also contains or has mounted thereon the necessary electrical motors, hydraulic pumps, fluid lines, soap reservoirs, and other components associated with the car wash. Electrical and water supply lines are pivotally suspended from the ceiling of the structure housing the car wash 10 and are connected at their free ends to the movable console. The console 13 consists of a box-like housing and an electrical distribution box 22 containing the control circuitry. Conventional switching means that regulates operation of the wash assembly 12 is mounted in box 22. Access to the electrical distribution box is through a door 23 that is hinged at 23a. A handle 23b is provided on the door.

As seen best in FIG. 3, a liquid pump 24, driven by an electric motor 25 through a belt 25a, provides water and water and soap mixtures, under pressure, to be sprayed through nozzles carried by the swinging arms 14 and the cantilever arm 15. Liquids from the pump 24 are forced through lines 26a and 26b to arms 14 and line 16c to arm 15. Soap solution is directed from a reservoir 27 through a line 27a into a pump 28, through line 28a and into the liquid pump 24 wherein it is combined with water. Water is supplied to pump 24 through a line 29 that is connected to an exterior source of heated water, not shown. A valve 20 positioned between soap pump 28 and liquid pump 24 is operated by the control circuitry to regulate the feed of soap solution to the liquid spray.

Hydraulic fluid, under pressure, is supplied through pump 31, FIG. 4, through lines 32 to double-acting cylinders 33. The housings of the cylinders 33 are pivotally mounted at 33a to frame sections 13a of the movable console. Piston rods 34 extend from the housings of cylinders 33 and are pivotally connected at 35 to swinging arms 14. The inward and outward movement of rods 34 thus rotate swinging arms 14 about their pivot connections with the frame 13a. The degree of contact pressure of rotating brushes that are mounted, as will be hereinafter explained, on the ends of arms 14, against the sides and ends of a vehicle being washed is controlled by fluid by-pass valves 36. By-pass valves 36 open at an adjustable preset pressure to relieve excess pressure from the rear of the piston rods through lines 37 back to the reservoir 38 from which pump 31 receives the fluid. Valves 39 in lines 32 are operated by the control circuitry to connect lines 32 with lines 32a, thereby supplying fluid under pressure to the rear ends of cylinders 33 and expelling rods 34 while at the same time exhausting fluid from the front ends of the cylinders through lines 32b and 32c or to alternately connect lines 32 and 32b while at the same time exhausting fluid through lines 32a and 32c to reservoir 38.

Arms 14 are each pivotally connected to the movable console 13 by a hinge arrangement consisting of projections 45 that extend from the sides of frame 13a and to which the arm structures are connected by pins 46.

An electric motor 40, FIG. 3, drives a chain 40a, a sprocket 40b fixed to an axle 41 and a ground engaging drive wheel 42. The ends of axle 41 are journaled into depending frame members 41a, FIG. 2, of the bottom of the body structure frame 13a and turning drive wheel 42 moves the movable console 13 on the guide wheels 20c and 20d. Limit switches 43a and 43b form part of the control circuitry and reverse and stop motor 40 and control the setting of valves 39 to swing arms 14 towards or away from a vehicle being washed as required for a cycle of operation of the car wash.

Vertically mounted rotating brushes 47 have their central axles journaled in upper and lower braces 14a and 14b of arms 14. The axles 48 extend through the upper braces and into gear boxes 49. Motors 50 are supported on the tops of upper braces 14a and the motors rotate the axles 48 and brushes thereon, through the gear boxes 49.

Liquid supplied by pump 24 through lines 26a and 26b is directed into vertical manifolds 51 positioned adjacent to the brushes 47 on the arms 14 and through nozzles 52 spaced along the manifolds. The nozzles are directed to spray the liquid inwardly of track 11 and onto a vehicle positioned therein.

As best seen in FIG. 2, the cantilever arm 15 includes a shaft 53 journaled through bearing mounting members 54a and 54b that project upwardly from the top of frame 13a of console 13. Spaced hangers 55a and 55b are journaled at their upper ends to the portion of arm 15 extending above the area bounded by track 11 and an axle 56 of a brush 57 is journaled in the lower ends of the hangers and extends through hanger 55a. A sprocket 58 is fixed on axle 56 and a chain 59 interconnects sprocket 58 and a sprocket 60 on a sleeve 61 journaled on shaft 53. Another sprocket 62 on sleeve 61 is connected by a chain 63 to a sprocket 64 on the output shaft of a motor 65 supported by a platform 66 on brackets 66a and 66b extending upward from the shaft 53. Operation of motor 65, thus turns the freely swinging brush 57, through the associated sprockets and chains. Spray nozzles 67 are spaced along a pipe 68 fixed to platform 66 and extending above brush 57. Nozzles 67 are arranged to point downward from pipe 68 to spray on a vehicle positioned therebeneath.

In operation, a vehicle, not shown, is moved through the open end of track 11 and is positioned by wheel guide rails 17 and 18 that guide the vehicles between the parallel track sections 16 and on pressure plate switch 19. Actuation of switch 19 initiates the vehicle washing cycle and through conventional circuitry starts motor 25 to operate pump 24 and to supply liquid through lines 26a, 26b and 26c to the liquid spray nozzles 52 and 67. Simultaneously, electric motors 50 and 65 are actuated to rotate brushes 47 and 57. Brush 57 is moved into contact with the essentially horizontal upper surfaces of the vehicle as the console 13 moves on track 11, and brushes 47 which are long enough to reach more than one half the distance between track sections 16 are moved into contact with the essentially vertical side and end surfaces of the vehicle as arms 14 are moved into the area bounded by track 11. Drive motor 40 is also actuated to move the console as previously described. Limit switches 43a and 43b on the ends of the track are connected electrically to the drive motor causing it to reverse its direction of rotation when the limit switches are contacted and to cut off power to the drive motor and other components after a predetermined cycle of operation. The console and structure carried thereby is thus moved back and forth along track 11. One vertical brush is pushed across the side and front vehicle surfaces, while the other one is dragged thereover during travel of the console in one direction of travel of the console and during travel in the opposite direction, the one brush is dragged while the other is pushed over the vehicle surfaces. One brush is alternately pulled and pushed over the vertical rear surfaces of the vehicle. The arrangement of the rotating brushes 47 and the alternate pushing and dragging effectively cleans the vehicle since a pushed brush is forced into all irregular surface areas of the vehicle and a brush is then dragged over the same surfaces.

Upon initiation of a wash cycle one first brush 47 is pivoted against the adjacent side of a vehicle and the other brush 47 pivots into contact with the rear end of the vehicle. The console moves from a start position around the track, pushing the first brush over the adjacent side, front and far side and more than one half of the rear end surfaces, while at the same time pulling the other brush 47 across slightly more than one half of the rear end, the adjacent side, the front end and most of the far side. When switch 43b is contacted the console reverses direction and the other brush 47 is pushed and the first brush is pulled. The other brush is then pushed across the far side, front end, adjacent side and slightly over one half of the rear end and the first brush is pulled across a portion of the rear end, the far side, the front end, and most of the adjacent side. This pattern of travel of the brushes is repeated as many times as may be programmed into a wash cycle.

The fluid applied to cylinders 33 positively, but resiliently holds the vertical brushes 47 against the vehicle and it should be apparent that in some cases a spring could also be employed to assist in biasing the arms 14 on which the brushes 47 are mounted against the vehicle. The springs, of course, would yield to allow the arms to move in and out as the brushes traverse the vehicle, but would insure continuous contact of the pushed and pulled brushes.

As shown in FIG. 6, it is also sometimes desirable to provide the swinging arms 14 with an "elbow" connection 70 near the brush carrying end thereof. In this construction an outermost portion 71 of the arm is pivotally connected to inner portions 72 of the upper and lower braces, as at 73. A pulley 74 is rotatably mounted on the outermost portion of the arm and a spring 75 has one end fixed at 76 to the inner portion, the other end of the spring is fixed to the outer portion at 77 and the spring passes around the pulley 74. In operation, the spring 75 pulls the outermost portion of the arm towards the interior of the track 11 and a vehicle positioned therein. The spring yields, however, and stretches around pulley 74 when necessary to allow the brush 47 carried by the arm 14 to move cleaning cycle. A stop 78 on the inner portion 72 of the arm 14 limits the extent to which the outermost portion 71 can be pivoted and prevents overstretching of the spring 75. Naturally, when the outermost portion engages stop 78, further force pushing the arm outward will activate the hydraulic bypass circuit, including valve 36 and the entire arm will swing outwardly until that force is reduced and the arm again swings in.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A car wash comprising
a movable console;
a generally U-shaped track, on which the movable console travels and within which a vehicle to be washed is adapted to be positioned;
a pair of arms each pivotally connected at one end to said movable console, said arms extending from opposite sides of the console;
a vertically mounted brush journaled at the other end of each arm;
motor means for rotating the vertically mounted brushes;
means for biasing the end of each arm on which said vertically mounted brushes are journaled inwardly towards the center of said track;
spray means carried by each said arm;
means for alternately supplying liquid soap and rinse sprays through the spray means and against a vehicle positioned within said track;
means for moving said movable console on said U-shaped track such that each said vertically mounted brush is alternately pushed and pulled over the vertical side and end surfaces of a vehicle positioned with said U-shaped track, with one of said brushes being pushed and pulled across more than one-half of the end of the vehicle at the open end of the track when the console is at the end of each leg of the track.

2. A car wash as recited in claim 1, wherein
the means biasing each arm includes a double-acting hydraulic cylinder connected between said arm and said console; and further including
means for supplying liquid under pressure to and relieving liquid under pressure from the opposite ends of the cylinder.

3. A car wash as recited in claim 2, further including
a pressure responsive by-pass means connecting an end of the cylinder to which pressure is applied to expel fluid from the cylinder to a hydraulic reservoir.

4. A car wash as recited in claim 1, further including means carried by said console for cleaning the upper substantially horizontal surfaces of a vehicle positioned within the track.

5. A car wash as in claim 4, wherein the means for cleaning the upper surfaces includes
an arm cantilevered from the movable console;
a rotating, horizontal brush suspended beneath said arm so as to extend across a vehicle parked within said track; and
means for spraying liquid soap and rinse water from above said horizontal brush onto the top and hood areas of a vehicle being washed.

6. A car wash as recited in claim 3, wherein
each arm pivotally connected to the console has an elbow formed adjacent the other end thereof pivotally interconnecting an inner portion of the arm and an outermost portion of the arm carrying the vertically mounted brush; and
means biasing the outermost portion of the arm inwardly with respect to the inner portion of the arm, towards the vehicle to be washed.

7. A car wash as recited in claim 6, further including stop means on the inner portion of the arm to limit outward rotation of the outermost portion of the arm with respect to the inner portion of the arm.

8. A car wash as recited in claim 1, wherein each arm pivotally connected to the console has an elbow formed adjacent the other end thereof pivotally interconnecting an inner portion of the arm carrying the vertically mounted brush; and means biasing the outermost portion of the arm inwardly with respect to the inner portion of the arm, towards the vehicle to be washed.

9. A car wash as recited in claim 8, further including stop means on the inner portion of the arm to limit outward rotation of the outermost portion of the arm with respect to the inner portion of the arm.

* * * * *